(12) United States Patent
Wu

(10) Patent No.: US 8,644,658 B2
(45) Date of Patent: Feb. 4, 2014

(54) LIGHT TRANSMISSION SYSTEM WITH OPTICAL WAVEGUIDE

(71) Applicant: Kai-Wen Wu, New Taipei (TW)

(72) Inventor: Kai-Wen Wu, New Taipei (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 13/660,015

(22) Filed: Oct. 25, 2012

(65) Prior Publication Data

US 2013/0308901 A1 Nov. 21, 2013

(30) Foreign Application Priority Data

May 16, 2012 (TW) .............................. 101117484 A

(51) Int. Cl.
*G02B 6/28* (2006.01)
*G02B 6/124* (2006.01)
*G02B 6/32* (2006.01)

(52) U.S. Cl.
USPC .................... 385/24; 385/14; 385/33; 385/45

(58) Field of Classification Search
CPC ............................ G02B 6/4259; G02B 6/1245
See application file for complete search history.

(56) References Cited

U.S. PATENT DOCUMENTS

| | | | |
|---|---|---|---|
| 7,496,265 B2 * | 2/2009 | Juni | 385/129 |
| 2008/0260326 A1 * | 10/2008 | Yabre et al. | 385/14 |
| 2010/0284647 A1 * | 11/2010 | Stevenson | 385/14 |

* cited by examiner

*Primary Examiner* — Omar Rojas
(74) *Attorney, Agent, or Firm* — Altis Law Group, Inc.

(57) ABSTRACT

A light transmission system includes a light guide support, a first convex lens, an optical waveguide member, and two second convex lenses. The light guide support includes a first surface, a second surface, a hollow space formed between the first surface and the second surface, and an inner reflecting surface forming an angle of 45 degrees relative to the first surface. The first convex lens is formed at the first surface, and configured for converging light to the inner reflecting surface. The optical waveguide member is located at the hollow space, and includes a main section parallel with the first surface, two first branch sections extending from and forming equal angles relative to the main section, and two second branch sections extending from the respective first branch sections. The two second convex lenses are formed at the second surface and aligned with the respective second branch sections.

7 Claims, 3 Drawing Sheets

LIGHT TRANSMISSION SYSTEM WITH OPTICAL WAVEGUIDE

BACKGROUND

1. Technical Field

The present disclosure relates to light transmission systems, and particularly to a light transmission system with an optical waveguide member.

2. Description of Related Art

Typical light transmission systems usually use one to one light transmission method during the entire transmission, thus, cannot satisfy a situation in which there needs to be transmission of one signal to more than one receiving end at a same time.

What is needed, therefore, is a light transmission system, which can overcome the above shortcomings.

BRIEF DESCRIPTION OF THE DRAWINGS

Many aspects of the present light transmission system can be better understood with reference to the following drawings. The components in the drawings are not necessarily drawn to scale, the emphasis instead being placed upon clearly illustrating the principles of the present light transmission system. Moreover, in the drawings, like reference numerals designate corresponding parts throughout the several views.

DETAILED DESCRIPTION

Embodiments of the present light transmission system will now be described in detail below and with reference to the drawings.

Figure 1:
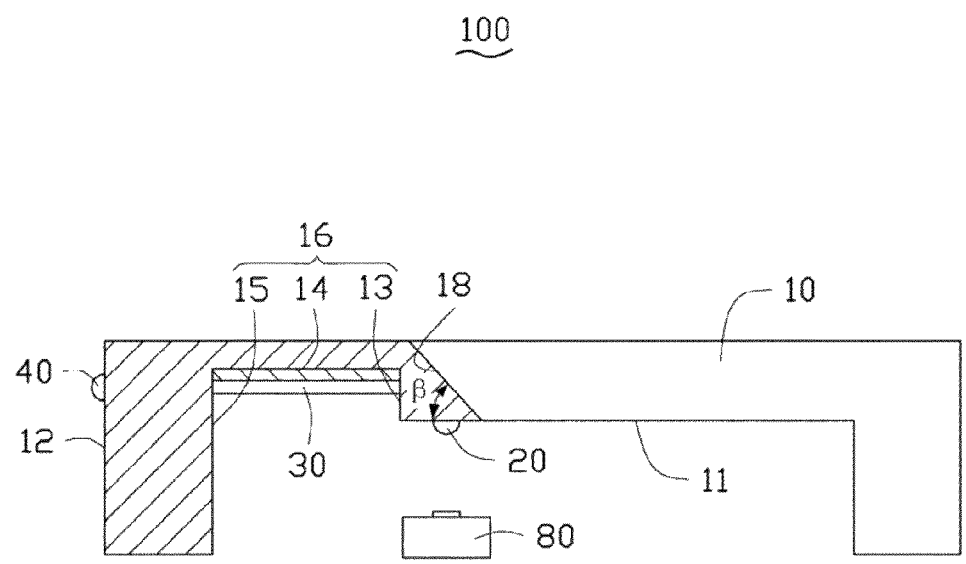
FIG. 1 is a partially cut-away view of a light transmission system in accordance with an embodiment, the light transmission system having an optical waveguide member.
Figure 2:
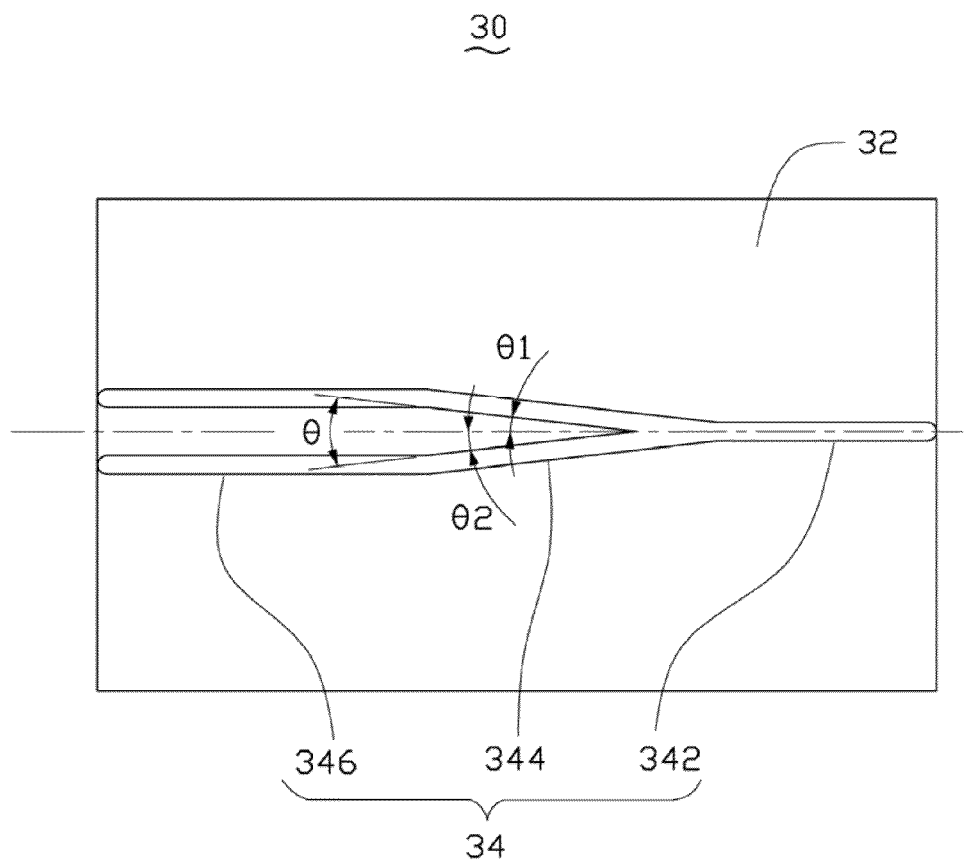
FIG. 2 is a plan view of the optical waveguide member of FIG. 1.
Figure 3:
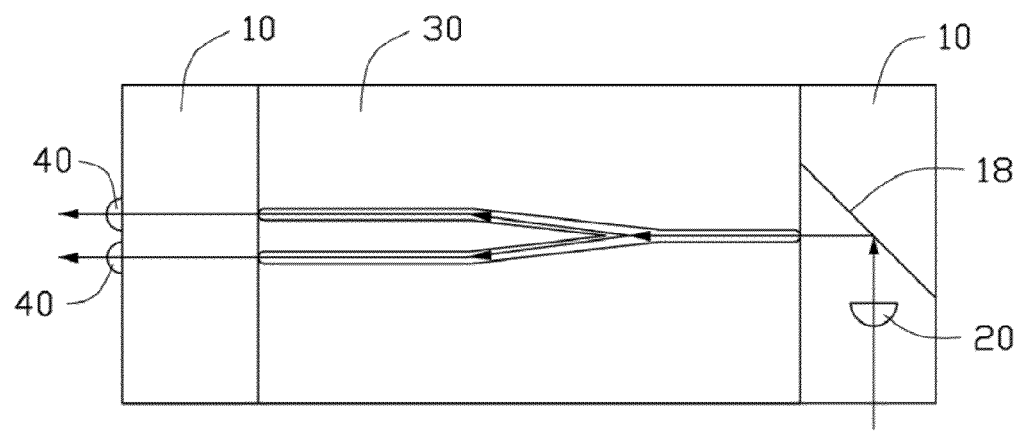
FIG. 3 is a schematic view of a light path of the light transmission system of FIG. 1.

Referring to FIGS. 1 to 3, a light transmission system 100 of one embodiment is shown. The light transmission system 100 includes a light guide support 10, a first convex lens 20, an optical waveguide member 30 and two second convex lenses 40.

The light guide support 10 is made of a light transmissible material, such as glass and plastic. The light guide support 10 includes a first surface 11, a second surface 12 perpendicular to the first surface 11, and a hollow space 16 located between the first surface 11 and the second surface 12. The hollow space 16 is rectangular-shaped, and includes a third surface 13 connected to and perpendicular to the first surface 11. In addition, a fourth surface 14 is connected to the third surface 13 parallel with the first surface 11, and a fifth surface 15 connected to the fourth surface 14 parallel with the second surface 12.

The light guide support 10 further includes an inner reflecting surface 18, and the inner reflecting surface 18 is connected to the first surface 11 with an included angle β about 45 degrees. Microstructures or reflecting film may be disposed on the inner reflecting surface 18.

The first convex lens 20 is located at the first surface 11, with a central optical axis perpendicular to first surface 11. The first convex lens 20 can be integrally formed with the light guide support 10, and is configured for converging incident light to the inner reflecting surface 18. The incident light can be provided by a light source 80. In the present embodiment, the light source 80 is a laser, which can emit out a parallel light.

The optical waveguide member 30 is located in the hollow space 16, and includes a substrate 32 and a planar optical waveguide 34 formed in the substrate 32. In the present embodiment, the substrate 32 is arranged adjacent to the fourth surface 14, and the planar optical waveguide 34 faces downwards. In other embodiments, the planar optical waveguide 34 may face upwards. The planar optical waveguide 34 includes a main section 342 parallel with the first surface 11, two first branch sections 344 each directly extending from the main section 342, and two second branch sections 346 extending from the respective first branch sections 344. The first branch sections 344 form included angles θ1, θ2 with a central axis of the main section 342, and the first branch sections 344 forming an included angle θ. The θ1 is equal to θ2 in a range of θ<θ1, θ2≤0.5, and the θ is in a range of 0.5≤θ≤1. The second branch sections 346 are parallel with each other, and parallel with the main section 342.

In the present embodiment, a distal end of the main section 342 is in contact with the third surface 13, and a distal end of each of the second branch sections 346 is in contact with the fifth surface 15. The inner reflecting surface 18 reflects light to the third surface 13. The main section 342 receives light from the third surface 13, the first branch sections 344 receive light from the main section 342, and the second branch sections 346 receive light from the respective first branch sections 344. As with the first branch sections 344 each space of the main section 342 includes a small angle, light loss, in light transmission among the main section 342 and the first branch sections 344 is insignificant.

The second convex lenses 40 are located at the second surface 12, and are aligned with the respective second branch sections 346. A central optical axis of each of the second convex lenses 40 is perpendicular to the second surface 12 and parallel with the first surface 11. The second convex lenses 40 can be integrally formed with the light guide support 10. Light emitted out from the second branch sections 346 transmits through the light guide support 10, and enters the second convex lenses 40.

The second convex lenses 40 each can be optically coupled to a light signal receiving device, such as an optical fiber, such that the light transmission system 100 can transmit light signal to two light signal receiving devices, i.e., one light signal is transmitted to two receiving ends at a same time.

It is understood that if more than two first branch sections 344 are formed with the planar optical waveguide 34, then the light transmission system can transmit light signal to more than two light signal receiving devices.

It is understood that the above-described embodiments are intended to illustrate rather than limit the disclosure. Variations may be made to the embodiments and methods without departing from the spirit of the disclosure. Accordingly, it is appropriate that the appended claims be construed broadly and in a manner consistent with the scope of the disclosure.

What is claimed is:

1. A light transmission system, comprising:
   a light guide support comprising a first surface, a second surface perpendicular to the first surface, a hollow space formed between the first surface and the second surface, and an inner reflecting surface forming an angle of 45 degrees relative to the first surface;
   a first convex lens formed on the first surface, and configured for receiving and converging a light to the inner reflecting surface;

an optical waveguide member received in the hollow space, the optical waveguide member comprising a substrate and a planar optical waveguide formed in the substrate, the planar optical waveguide comprising a main section parallel with the first surface, two first branch sections extending from the main section, and two second branch sections extending from the respective first branch sections, the main section configured for receiving reflected light from the inner reflecting surface, the first branch sections forming equal angles relative to the main section, the second branch sections being parallel with the main section; and two second convex lenses formed on the second surface and aligned with the respective second branch sections.

2. The light transmission system of claim 1, wherein central optical axes of the second convex lenses are parallel with each other, and a central optical axis of the first convex lenses is perpendicular to the central optical axes of the second convex lenses.

3. The light transmission system of claim 1, wherein the first convex lenses and the second convex lenses are integrally formed with the light guide support.

4. The light transmission system of claim 1, wherein the angle between each of the first branch sections and the main section is in a range of 0 degree to 0.5 degrees, and an angle between the first branch sections is in a range of 0 degree to 1 degree.

5. The light transmission system of claim 1, wherein the light guide support further comprises a third surface, a fourth surface and a fifth surface in the hollow space, the third surface is connected to and perpendicular to the first surface, the fourth surface is connected to the third surface and parallel with the first surface, and the fifth surface is connected to the fourth surface and parallel with the second surface.

6. The light transmission system of claim 5, wherein the substrate is arranged adjacent to the fourth surface, and the planar optical waveguide faces downwards.

7. The light transmission system of claim 5, wherein a distal end of the main section is in contact with the third surface, and a distal end of each of the second branch sections is in contact with the fifth surface.

\* \* \* \* \*